(12) United States Patent
Brito et al.

(10) Patent No.: US 8,792,715 B2
(45) Date of Patent: Jul. 29, 2014

(54) SYSTEM AND METHOD FOR FORMS CLASSIFICATION BY LINE-ART ALIGNMENT

(75) Inventors: Alejandro E. Brito, Mountain View, CA (US); Eric Saund, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 74 days.

(21) Appl. No.: 13/539,941

(22) Filed: Jul. 2, 2012

(65) Prior Publication Data

US 2014/0003717 A1    Jan. 2, 2014

(51) Int. Cl.
*G06K 9/00* (2006.01)

(52) U.S. Cl.
USPC ............ 382/170; 382/209; 382/190; 382/305; 382/218; 382/203

(58) Field of Classification Search
CPC ...................................................... G06T 7/001
USPC .................... 382/209, 170, 190, 305
See application file for complete search history.

(56) References Cited

U.S. PATENT DOCUMENTS

| | | | |
|---|---|---|---|
| 2007/0047819 A1* | 3/2007 | Hull et al. ..................... | 382/190 |
| 2009/0154778 A1* | 6/2009 | Lei et al. ..................... | 382/112 |
| 2009/0324100 A1 | 12/2009 | Kletter et al. | |
| 2012/0070091 A1 | 3/2012 | Saund | |
| 2013/0257874 A1* | 10/2013 | Saund .......................... | 345/440 |

OTHER PUBLICATIONS

Felzenszwalb, Pedro, et al., "Distance Transforms of Sampled Functions", Sep. 1, 2004.
Kumar, et al., "Fast Rule-line Removal using Integral Images and Support Vector Machines", ICDAR, 2011.
Shi, et al., "Image Enhancement for Degraded Binary Document Images", 2011 ICDAR, IEEE, p. 895-899.

* cited by examiner

*Primary Examiner* — Ali Bayat
(74) *Attorney, Agent, or Firm* — Fay Sharpe LLP

(57) ABSTRACT

A system and method to classify forms. An image representing a form of an unknown document type is received. The image includes line-art. Further, a plurality of template models corresponding to a plurality of different document types is received. The plurality of different document types is intended to include the correct document type of the unknown document. A subset of the plurality of template models are selected as candidate template models. The candidate template models include line-art junctions best matching line-art junctions of the received image. One of the candidate template models is selected as a best candidate template model. The best candidate template model includes horizontal and vertical lines best matching horizontal and vertical lines of the received image, respectively, aligned to the best candidate template model.

22 Claims, 14 Drawing Sheets

$$\begin{matrix} \text{test} & & & \text{reference} \\ [\, 1\ 0\ x_1'\ 0\ \,] & [\, \text{transX}\ ] & & [\, x_1\ ] \\ [\, 0\ 1\ 0\ \ y_1'\,] & [\, \text{transY}\ ] & & [\, y_1\ ] \\ [\ :\ \ :\ \ :\ \ \ :\ \,] * [\, \text{sclx}\ \ \ \ ] & = & [\ :\ ] \\ [\, 1\ 0\ x_n'\ 0\ \,] & [\, \text{scly}\ \ \ \ ] & & [\, x_n\ ] \\ [\, 0\ 1\ 0\ \ y_m'\,] & & & [\, y_m\ ] \end{matrix}$$

FIG. 12A

$$\begin{matrix} \text{test} & & \text{reference} \\ [\ x_1'\ ] & & [\ y_1 - y_1'\ ] \\ [-y_1'\ ] & & [\ x_1 - x_1'\ ] \\ [\ :\ \ ] * [\ \text{theta}\ ] = & [\ :\ ] \\ [\ x_n'\ ] & & [\ y_n - y_n'\ ] \\ [-y_m'\ ] & & [\ x_m - x_m'\ ] \end{matrix}$$

SYSTEM AND METHOD FOR FORMS CLASSIFICATION BY LINE-ART ALIGNMENT

BACKGROUND

The present exemplary embodiments disclosed herein relate generally to image processing. They find particular application in conjunction with classifying forms and background subtraction, and will be described with particular reference thereto. However, it is to be appreciated that the present exemplary embodiments are also amenable to other like applications.

Forms are a type of document that usually contains descriptive line-art to define data fields for entry of data. The spatial organization of data fields facilitates capturing data in a structured and organized fashion by human and automatic means. In a straightforward case, each data field can be cropped out of an image of the form and run through Optical Character Recognition (OCR) individually. This is called zonal OCR.

Zonal OCR works correctly when printed and/or handwritten data is confined to the correct locations on the form, as defined by the boundaries of the data fields. However, zonal OCR fails to work correctly when printed and/or handwritten data is misregistered with respect to the data fields. Data field definitions usually depend on a particular type of form that is used to establish the nominal locations. FIG. 1 provides an example of a form where the nominal locations of the data fields are demarked by the form line-art.

A common work flow for production imaging services is to classify batches of scanned form images into sets of multiple document types and extract the data items in the corresponding data field locations. Challenges with such processing are determining the document type of a given image, aligning (i.e., registering) the image to a template model corresponding to the document type, and subtracting the form line-art and field text descriptions in order to allow successful application of Zonal OCR. Ultimately, solutions to these problems require accurate document type determination, data field registration, and subtraction of printed background form information.

Known solutions perform template matching classification (usually with a subsampled version of the original image for fast processing) or by applying a discriminative classifier using low-level features extracted from the image pixels or connected components. Next, a registration step is performed mainly using corresponding points derived by matching image blocks to special fiducial markings or image anchor templates. Finally, printed background form information removal is performed, which could be guided by a template model or by connected component filters. Connected component filters, however, usually wipe out key character features (such as dots, dashes, etc.), as well as parts of broken up characters in poor quality images.

The present application provides new and improved methods and systems which overcome the above-referenced challenges.

INCORPORATION BY REFERENCE

U.S. patent application Ser. No. 12/147,624 (US Patent Publication No. 2009/0324100) for METHOD AND SYSTEM FOR FINDING A DOCUMENT IMAGE IN A DOCUMENT COLLECTION USING LOCALIZED TWO-DIMENSIONAL VISUAL FINGERPRINTS, by Kletter et al., filed on Jun. 27, 2008, U.S. patent application Ser. No. 12/883,503 (US Patent Publication No. 2012/0070091) for GRAPH LATTICE METHOD FOR IMAGE CLUSTERING, CLASSIFICATION, AND REPEATED STRUCTURE FINDING, by Eric Saund, filed on Sep. 16, 2010, Pedro Felzenszwalb and Daniel Huttenlocher, "Distance Transforms of Sampled Functions", Sep. 1, 2004, Kumar and Doermann, "Fast Rule-line Removal using Integral Images and Support Vector Machines", ICDAR, 2011 Shi, Setlur, and Govindaraju, "Image Enhancement for Degraded Binary Document Images", ICDAR, 2011, are each hereby incorporated herein by reference in entirety.

BRIEF DESCRIPTION

According to one aspect of the present disclosure, a method for classifying forms is provided. An image representing a form of an unknown document type is received. The image includes line-art. Further, a plurality of template models corresponding to a plurality of different document types is received. The plurality of different document types is intended to include the unknown document type. A subset of the plurality of template models are selected as candidate template models. The candidate template models include line-art junctions best matching line-art junctions of the received image. One of the candidate template models is selected as a best candidate template model. The best candidate template model includes horizontal and vertical lines best matching horizontal and vertical lines of the received image, respectively, aligned to the best candidate template model.

According to another aspect of the present disclosure, a system for classifying forms is provided. The system includes at least one processor programmed to receive an image representing a form of an unknown document type. The image includes line-art. Further, a plurality of template models corresponding to a plurality of different document types is received. The plurality of different document types is intended to include the unknown document type. A subset number of the plurality of template models are selected as candidate template models. The candidate template models include line-art junctions best matching line-art junctions of the received image. One of the candidate template models is selected as a best candidate template model. The best candidate template model includes horizontal and vertical lines best matching horizontal and vertical lines of the received image, respectively, aligned to the best candidate template model.

According to another aspect of the present disclosure, a system for classifying forms is provided. The system includes at least one processor programmed to receive an image representing a form of an unknown document type. The image includes line-art. Further, a plurality of template models corresponding to a plurality of different document types is received. The plurality of different document types is intended to include the unknown document type. Horizontal and vertical lines from the received image are extracted. For each of the plurality of template models: 1) the extracted horizontal and vertical lines are aligned to horizontal and vertical lines of the template model, respectively; 2) a first match score indicating a match quality of the aligned horizontal and vertical lines to the horizontal and vertical lines of the template model, respectively, is determined; and 3) a second match score indicating a match quality of the horizontal and vertical lines of the template model to the aligned horizontal and vertical lines, respectively, is determined. A best one of the plurality of template models is determined based on the first and second match scores.

BRIEF DESCRIPTION OF THE DRAWINGS

Figure 1:
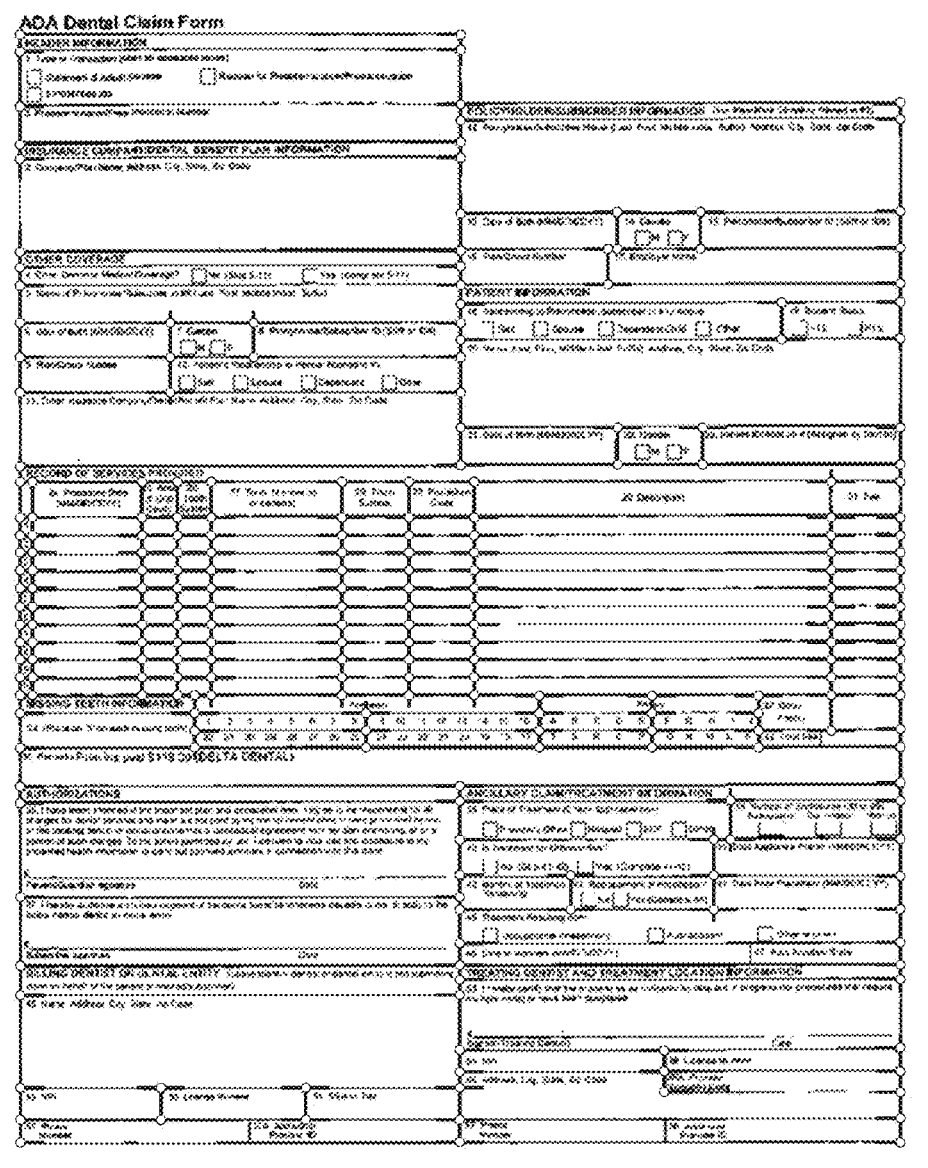

FIG. 1 is an example of a form with line-art de marking the data fields of the form and junctions represented by circles.

FIG. 4 is an illustration of a zone model of a template model overlaid on an example of a form.

FIG. 12A is a linear system for determining scaling and translation parameters.

FIG. 12B is a linear system for determining a rotation parameter.

FIG. 13 is an illustration of portion of a form after form background information removal with an overlay of a zone model.

DETAILED DESCRIPTION

By way of background, the present application provides a method and system for performing document type classification of a test image representing a form which has characteristic line-art and for subtracting the line-art and data field text descriptions once the document type has been identified using a template model for the identified document type.

The disclosure includes extracting line-art of the test image. Thereafter, an initial classification stage is performed that uses line-art junctions as key points to generate a fingerprint frequency descriptor of the test image. The fingerprint frequency descriptor is compared against fingerprint frequency descriptors corresponding to a set of template models, each template model corresponding to a different document type. Based on the comparison, the top N template models are selected. A successive classification step is then performed where the line-art of the test image is aligned to the top N template models. For each of the top N template models, a forward and a backward evaluation of the alignment is computed using distance transforms to generate a score for the alignment. The line-art and data field text descriptors of the test image are then subtracted using the best template model.

Figure 2:
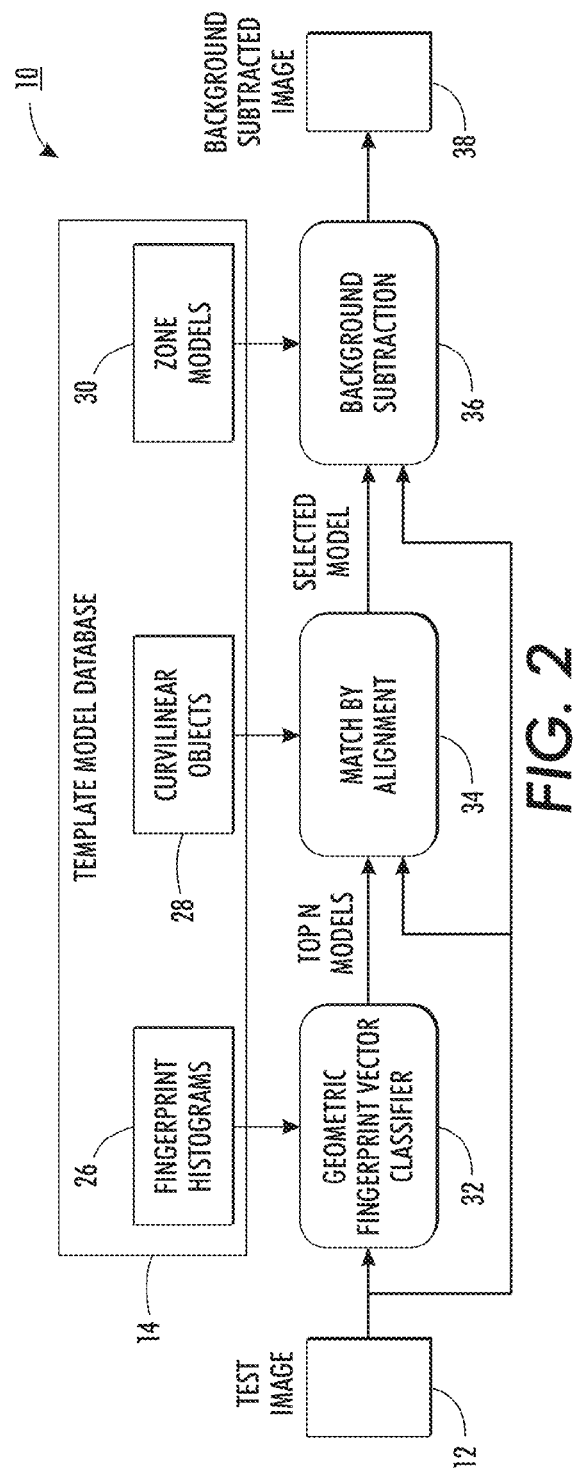
FIG. 2 is an illustration of a processor diagram of a method for classifying forms and for background subtraction.

With reference to FIG. 2, a processor diagram of a method 10 for classifying forms and for background subtraction is illustrated. The method 10 includes receiving a test image 12 representing a form. The form includes one or more data fields, typically, a plurality, and a layout specified by the positioning of the data fields on the form. Further, the form includes descriptive line-art that can lead to establishing nominal locations for the extraction of data from data fields.

Figure 3:
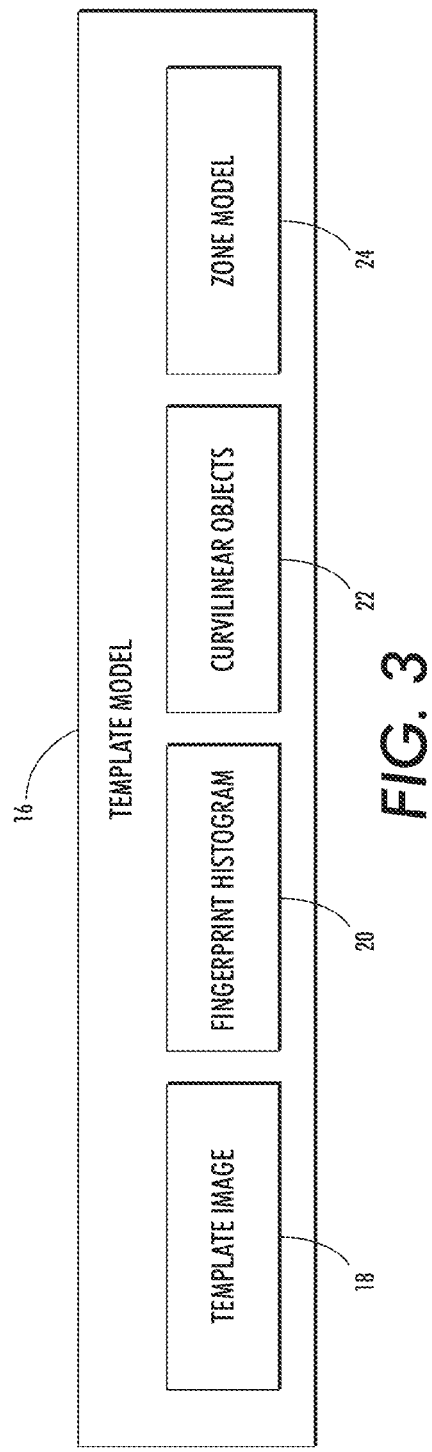
FIG. 3 is a block diagram of a template model.

The method 10 further includes receiving a template model database 14. The template model database 14 includes a template model 16 (shown in FIG. 3) for each document type the method 10 can identify. As shown in FIG. 3, each template model 16 includes an optional template image 18, a fingerprint histogram 20, curvilinear objects 22, and a zone model 24, the template image 18 being exemplary of the document type of the template model 16. During a setup phase preceding use of the method 10, the fingerprint histogram 20, the curvilinear objects 22, and the zone model 24 are determined from the template image 18. In this way, the template model database 14 of FIG. 2 further includes fingerprint histograms 26, curvilinear objects 28, zone models 30 and optionally template images (not shown).

The fingerprint histogram of a template model typically maps between fingerprints of the template image of the template model and the appearance frequency counts of the fingerprints in the template image. The fingerprints are generated from keypoints, which are line-art junctions of the template image. The fingerprints and fingerprint histogram of template models are generated in the same manner employed to generate the fingerprints and fingerprint histogram of the test image 12, discussed hereafter. As will be seen, the fingerprint histogram is used to compute a similarity measurement between the test image 12 and the template model.

The curvilinear objects of a template model include horizontal and vertical lines of the template image of the template model. In some embodiments, the curvilinear objects are stored in chain-code curve representation. The curvilinear objects are extracted from the template image according to the same approach employed to extract the curvilinear objects of the test image 12, discussed hereafter in connection with matching by alignment. As will be seen, the curvilinear objects are used to one or more of: (1) find point correspondences between the test image 12 and the template image; (2) estimate transformation parameters to align curvilinear objects of the test image 12 to curvilinear objects of the template image; and (3) compute forward and backward distance transforms to produce a score for how well the template image matches the test image 12.

Figure 4:
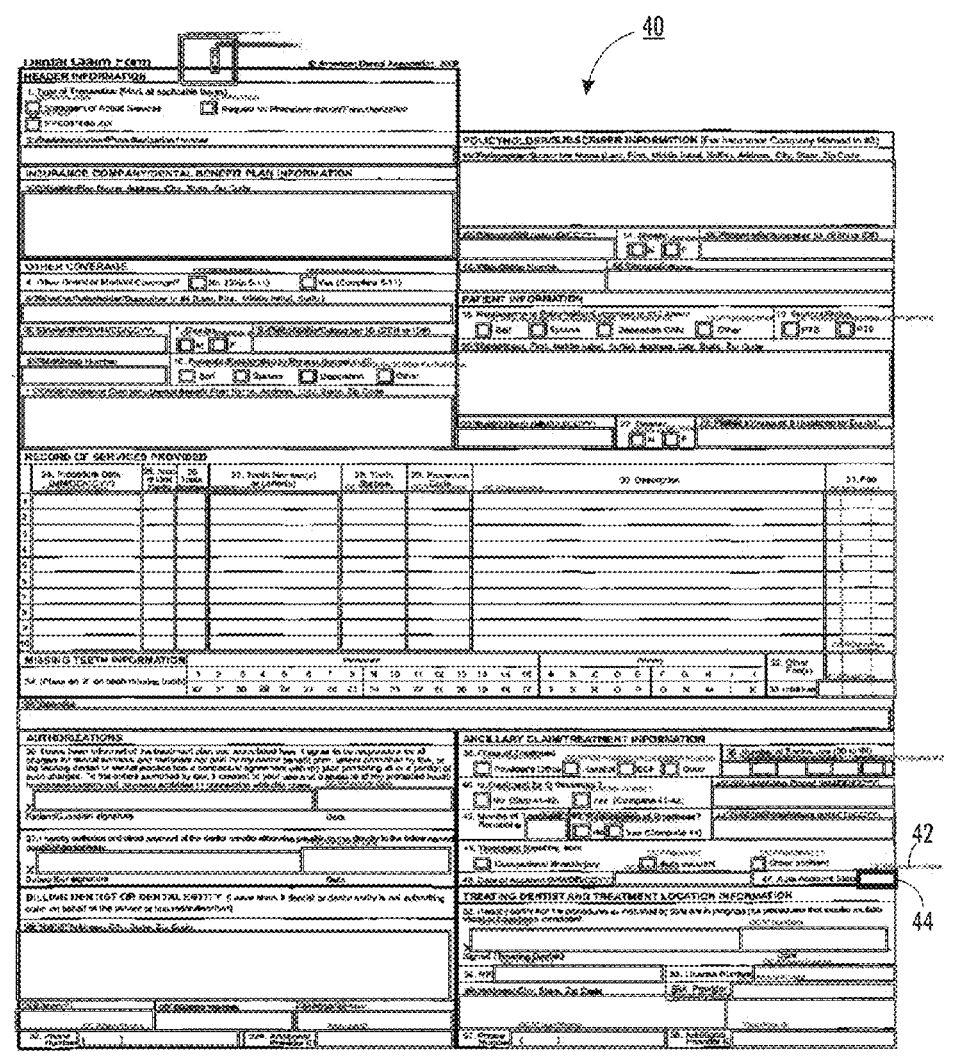

The zone model of a template model identifies, for each data field of the template image of template model, properties of the data field and the placement, including location and size, of the data field on the template image. Data field properties include, for example, one or more of field name, extraction area number, the type of text pattern the data field is expected to contain, and so on. Typically, an operator of the method 10 specifies the zone model using, for example, a user input device. FIG. 4 illustrates an example of a zone model overlaid on a form 40, the zone model including data field names, such as a data field name 42, and data field placements. Data field placements are represented by zone boundaries, such a zone boundaries 44. As will be seen, the zone model is used to subtract background form information, including line-art and data field text descriptions, of the test image 12.

Using the test image 12 and template model database 14, a subset (i.e., N), such as a predetermined number, of the best template models (hereafter referred to as candidate template models) are selected (e.g., using a geometric fingerprint vector classifier) 32 by comparing the test image 12 to the template images of the template model database 14 using line-art junctions and scoring the match quality of the template images. This can be performed using any algorithm that uses line-art junctions, as is known in the art. In one embodiment, the graph lattice method for classification of U.S. patent application Ser. No. 12/883,503 (US Patent Publication No. 2012/0070091) for GRAPH LATTICE METHOD FOR IMAGE CLUSTERING, CLASSIFICATION, AND REPEATED STRUCTURE FINDING, by Eric Saund, filed on Sep. 16, 2010, incorporated herein by reference in its entirety, is employed. However, preferably, the method 50 of FIG. 5, using a geometric fingerprint vector classifier, is employed.

Figure 5:
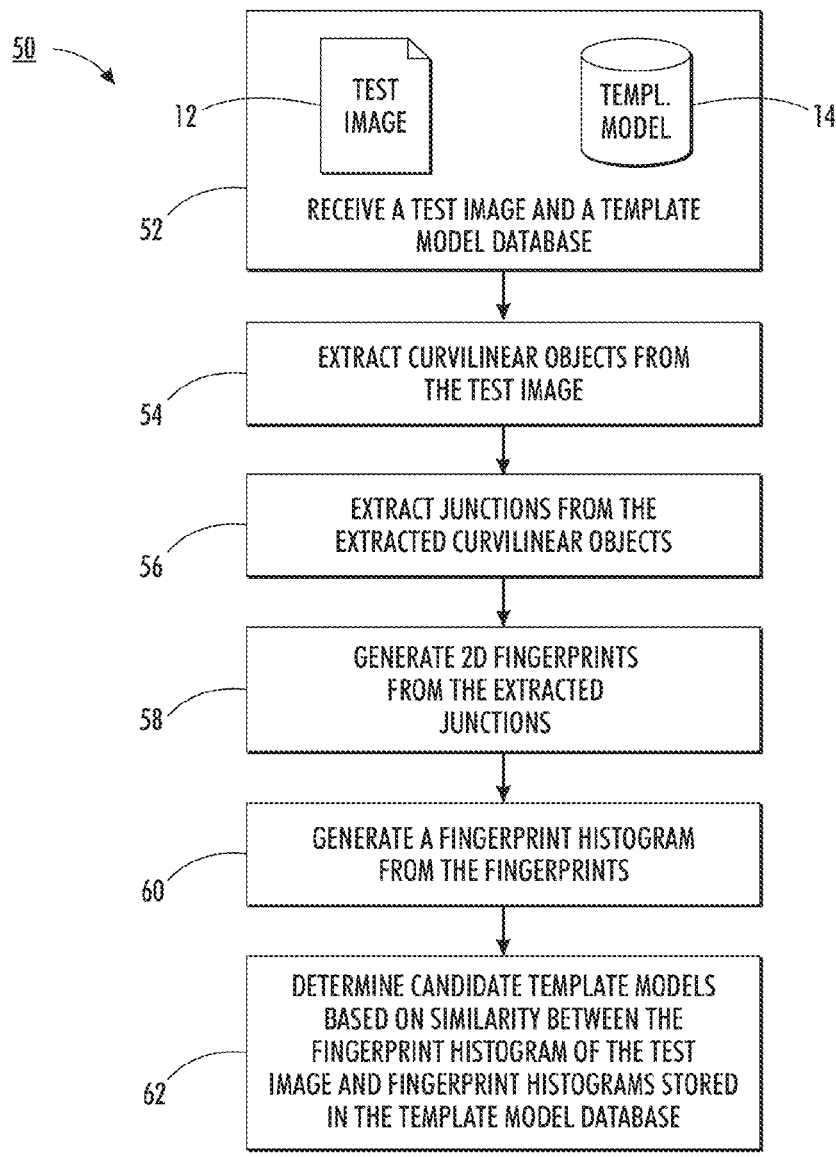
FIG. 5 is a block diagram of a method for identifying candidate template models using fingerprints computed from line-art junctions.
Figure 6:
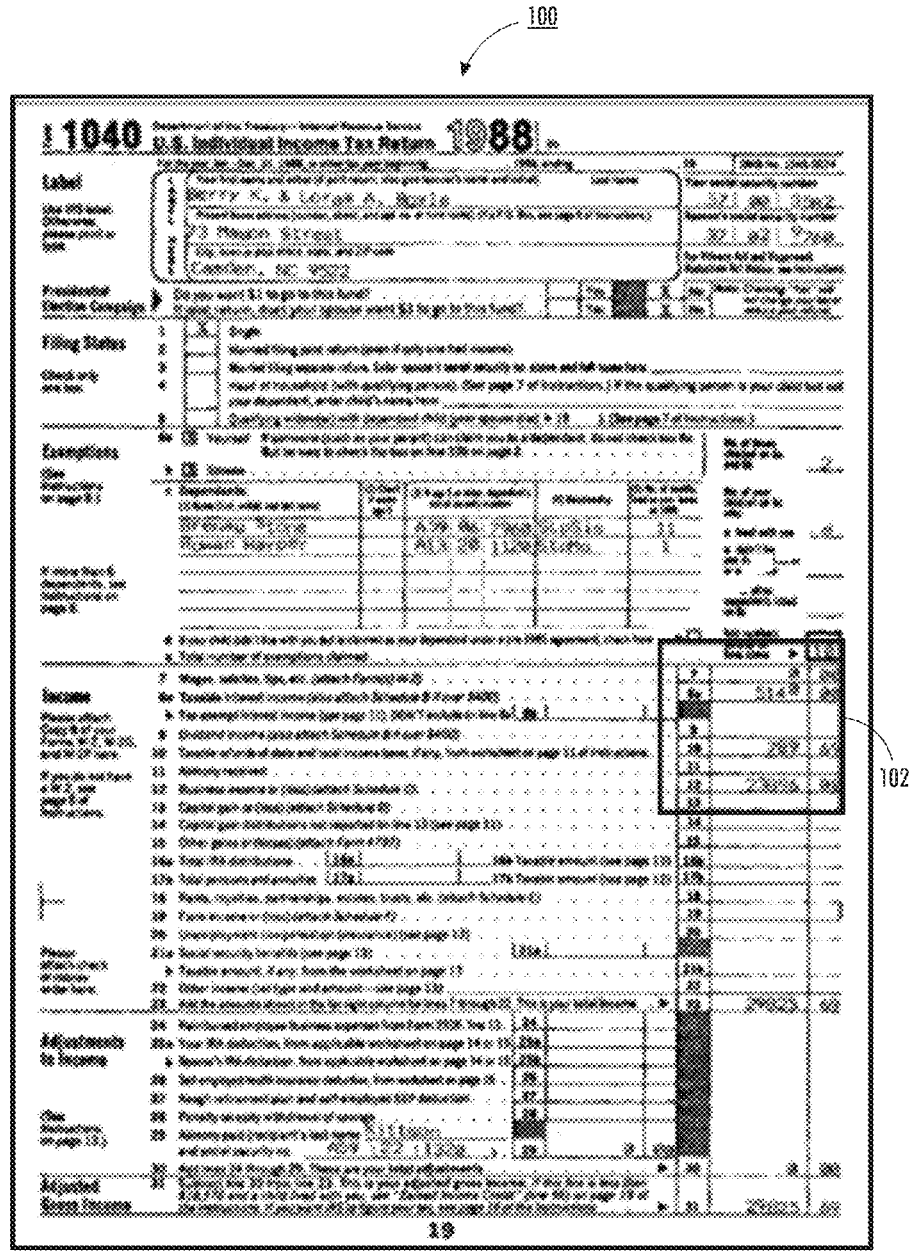
FIG. 6 is an example of a form with a portion thereof selected.
Figure 7A:
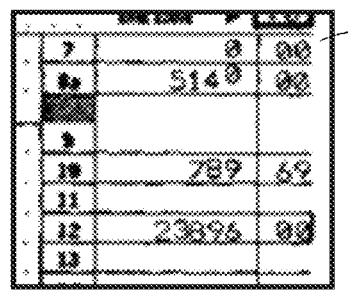
FIG. 7A is an enlarged view of the selected portion of FIG. 6.
Figure 7B:
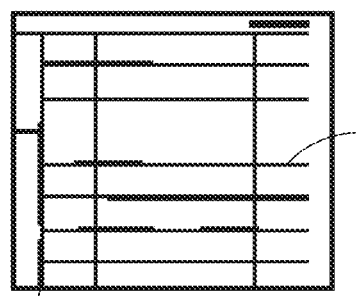
FIG. 7B is an illustration of the horizontal and vertical lines of the selected portion of FIG. 6.
Figure 7C:
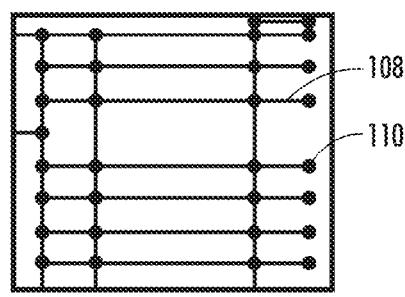
FIG. 7C is an illustration of curve fragments (i.e., line segments) and junctions of the selected portion of FIG. 6.

The method 50 of FIG. 5 includes receiving 52 the test image 12 and the template model database 14. Curvilinear objects are then extracted 54 from the test image 12, and line-art junctions are extracted 56 from the curvilinear objects. FIG. 6 illustrates an example of a form 100 with a portion 102 thereof selected. FIG. 7A illustrates an enlarged view of the selected portion 102. FIG. 7B illustrates the horizontal and vertical lines of the selected portion 102, such as a horizontal line 104 and a vertical line 106. FIG. 7C illustrates curve fragments (i.e., line segments) and junctions of the selected portion 102, such as a curve fragment 108 and a junction 110. Thereafter, a set, such as a predetermined number, of fingerprints are generated 58 from the extracted line-art junctions, the line-art junctions being employed as keypoints.

Figure 8A:
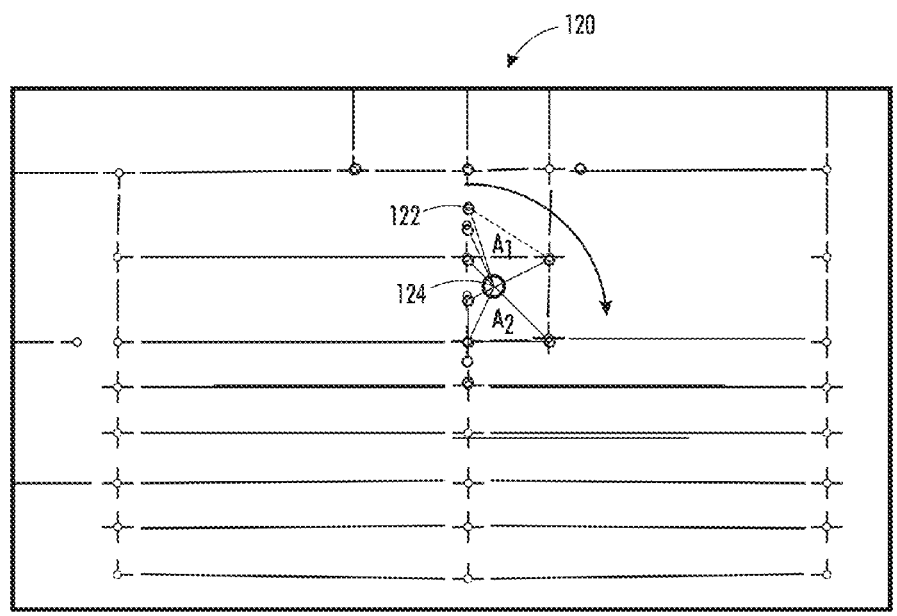
FIG. 8A is an illustration of a portion of a form, the key-points of a fingerprint, and a center of origin of the keypoints.
Figure 8B:
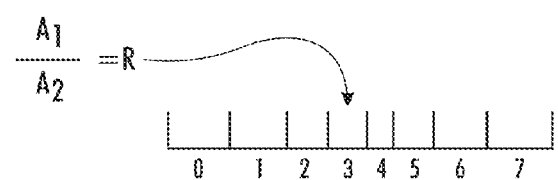
FIG. 8B is an illustration of the generation and quantization of one of the area ratios of the fingerprint of FIG. 8A.

While any approach known to those skilled in the art can be employed to generate the fingerprints, the fingerprints are suitably generated according to the method of U.S. patent application Ser. No. 12/147,624 (US Patent Publication No. 2009/0324100) for METHOD AND SYSTEM FOR FINDING A DOCUMENT IMAGE IN A DOCUMENT COLLECTION USING LOCALIZED TWO-DIMENSIONAL VISUAL FINGERPRINTS, by Kletter et al., filed on Jun. 27, 2008, incorporated herein by reference in its entirety. With reference to FIGS. 8A & 8B, the generation of a fingerprint according to this method is illustrated. FIG. 8A illustrates a portion 120 of a form and the keypoints, such as a junction 122, of a fingerprint. Further illustrated is a center of origin 124 of the keypoints. A sequence of triangle area ratios between the keypoints of the fingerprint are then determined in a clockwise direction to generate the fingerprint. For example, the fingerprint might be "254612245263774616773361". FIG. 8B illustrates the generation and quantization of one of the ratios.

Referring back to FIG. 5, a fingerprint histogram is generated 60 from the fingerprints. This includes, for each of the fingerprints, counting the number of times the fingerprint matches the test image 12. Further, the fingerprints are stably ordered and combined with the counts into the fingerprint histogram. The bins of the fingerprint histogram correspond to the counts of fingerprint matches. In this way, the fingerprint histogram maps between the fingerprints of the test image 12 and the counts of the fingerprints in the test image 12. As will be appreciated, the fingerprint histogram of the test image 12 is generated in the same manner as the fingerprint histograms of the template images.

The candidate template models are then determined 62 based on similarity between the fingerprint histogram of the test image 12 and the fingerprint histograms 26 of the template model database 14. In that regard, the fingerprint histogram of the test image 12 is compared to each of the fingerprint histograms 26 of the template model database 14 and similarity scores are generated. The similarity scores can be generated using, for example, one of cosine, common-minus difference, and Dice's coefficient. Histogram counts may be normalized by total number of fingerprints. The best template models, as determined by the similarity scores, are then selected as the candidate template models.

Figure 9:
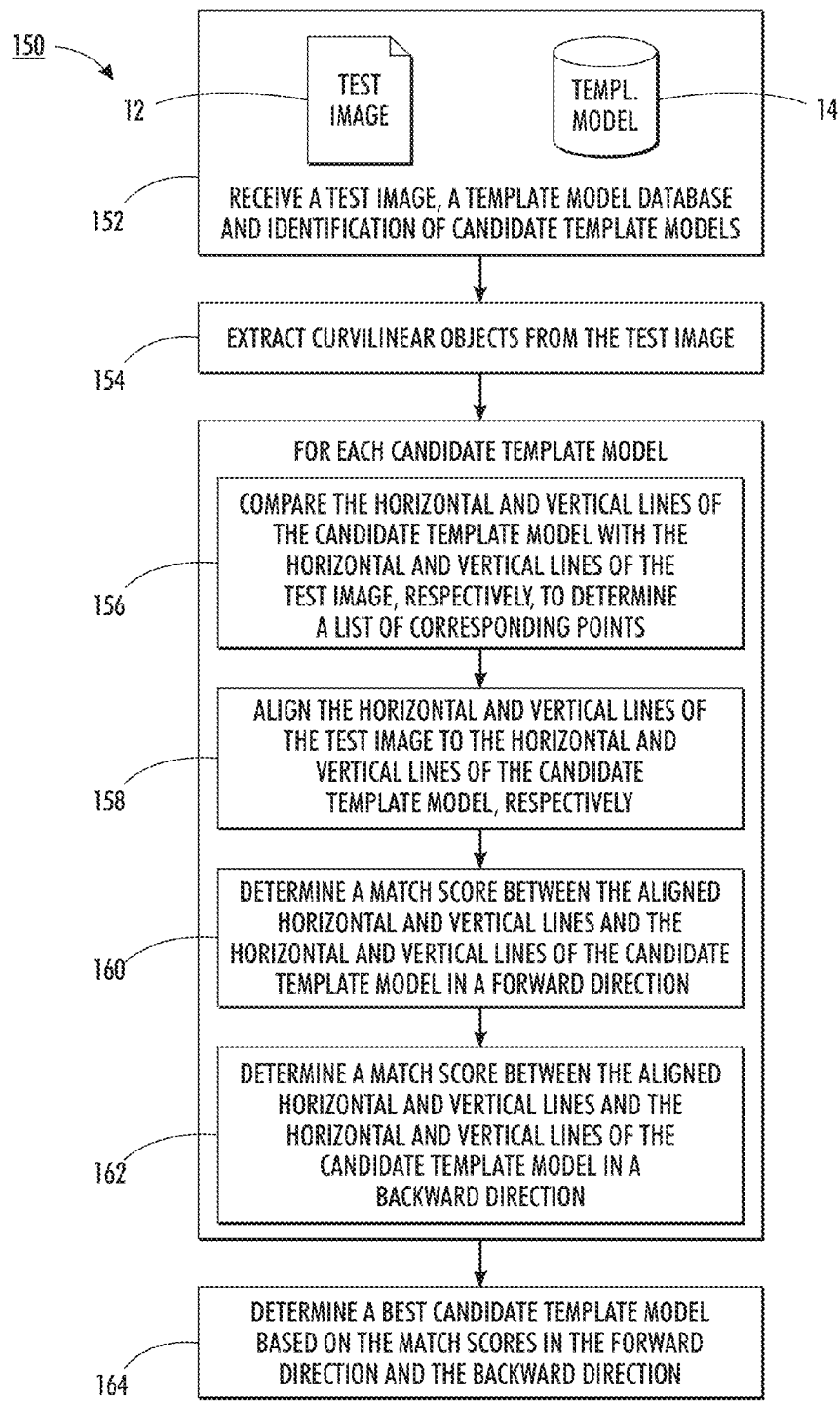
FIG. 9 is a block diagram of a match-by-alignment method.

Referring back to FIG. 2, once the candidate template models are selected 32, the candidate template model best matching the test image 12 is selected (e.g., by matching by alignment) 34 using a match-by-alignment method 150 of FIG. 9. The method 150 includes receiving 152 the test image 12, the template model database 14, and identification of the candidate template models. Curvilinear objects, including horizontal and vertical lines, of the test image 12 are then extracted 154. In some embodiments, the horizontal and vertical curvilinear objects are stored in chain-code curve representation, which allows the curvilinear objects to be compactly represented (i.e., less memory usage). As should be appreciated, this is the same procedure employed to extract the curvilinear objects 28 of the template model database 14 from the template images.

For each candidate template model, the horizontal and vertical lines of the candidate template model, obtained from the template model database 14, are compared 156 to the horizontal and vertical lines of the test image 12, respectively, to determine a list of corresponding points. This includes, for each of the test image 12 and the candidate template model, sorting the horizontal lines relative to their vertical location (i.e., y-coordinate) and sorting the vertical lines relative to their horizontal location (i.e., x-coordinate).

The horizontal lines of the test image 12 and the candidate template model are evaluated to find corresponding pairs in ascending order relative to vertical location (e.g., from top to bottom) and in descending order relative to vertical location (e.g., from bottom to top). Further, the vertical lines of the test image 12 and the candidate template model are each evaluated to find corresponding pairs in ascending order relative to horizontal location (e.g., from left to right) and in descending order relative to horizontal location (e.g., from right to left). The evaluations choose corresponding pairs by a scoring function that takes into account location proximity and length similarity, optionally with a preference bias to select corresponding pairs close to the outer sides of the test image 12.

Once corresponding pairs of lines are found, a list of corresponding pairs of points is generated. This includes, for each pair of lines, choosing at least one pair of corresponding points, typically two pairs. The corresponding point(s) of a pair of lines are suitably chosen close to the ends of the lines of the pair. Where two pairs of points are chosen for a pair of lines, the two pairs of points are typically chosen at opposite ends of the pair of lines. Optionally, the list of corresponding pairs of points is inspected to remove outliers. Any one of several methods known to those skilled in the art can perform the inspection, such as, for example, interquartile range rejection. However, preferably, the inspection is performed by, for each pair of points, computing the mean and standard deviation (i.e., stdev) on the x and y components independently. Pairs of points outside the range of [mean−1.5*stdev,mean+ 1.5*stdev] in either x or y components are removed.

Figure 10A:
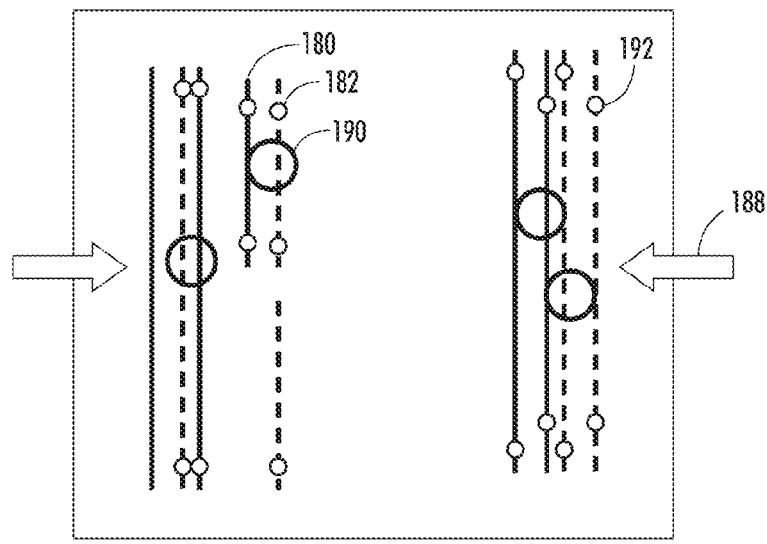
FIG. 10A is an illustration of a search for corresponding pairs of points of vertical lines.
Figure 10B:
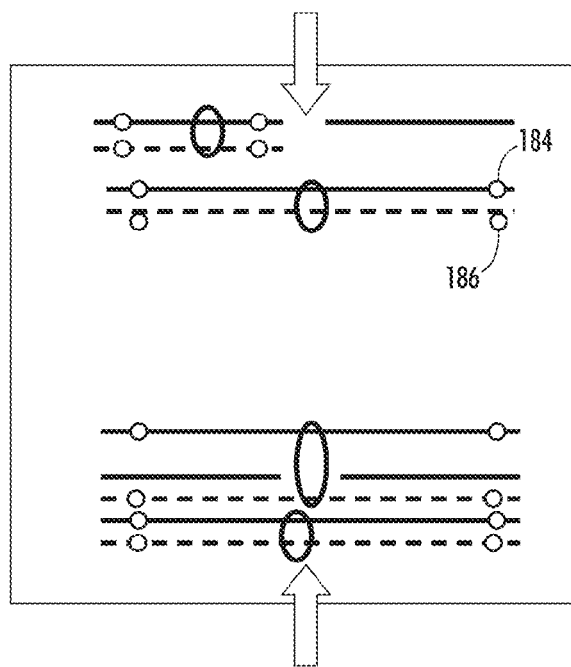
FIG. 10B is an illustration of a search for corresponding pairs of points of horizontal lines.

With reference to FIGS. 10A and 10B, the search for corresponding pairs of points is illustrated. FIG. 10A illustrates the search for corresponding pairs of points among vertical lines, such as lines 180, 182, and FIG. 10B illustrates the search for corresponding pairs of points among horizontal lines, such as lines 184, 186. The dashed lines correspond to the test image 12 and the solid lines correspond to the candidate template model. The arrows, such as an arrow 188, indicate the direction in which the lines are evaluated, and the circles and/or ovals across two lines, such as a circle 190, indicate pairs of lines. The points, such as a point 192, at the ends of the lines form the pairs of points.

Referring back to FIG. 9, if the list of corresponding pairs of points includes less than a predetermined number of pairs of points, the method 150 can optionally stop. The predetermined number is suitably set at the minimum number of pairs of points needed to perform the remainder of the method 150, as determined by the operator. Assuming the method 150 proceeds, the list of corresponding pairs of points is employed to align 158 the horizontal and vertical lines of the test image 12 to the horizontal and vertical lines of the candidate template model, respectively.

The alignment 158 includes determining a transformation matrix registering the test image points of the list of corresponding pairs of points to the candidate template model points of the list of corresponding pairs of points. The transformation matrix is formed of one or more transformation parameters and can include parameters for rigid and/or non-rigid transformations, such as, for example, one or more of x and y translations, scaling, and rotation. The rotation can optionally be limited to a certain range, such as [−10, 10] degrees.

Figure 11:
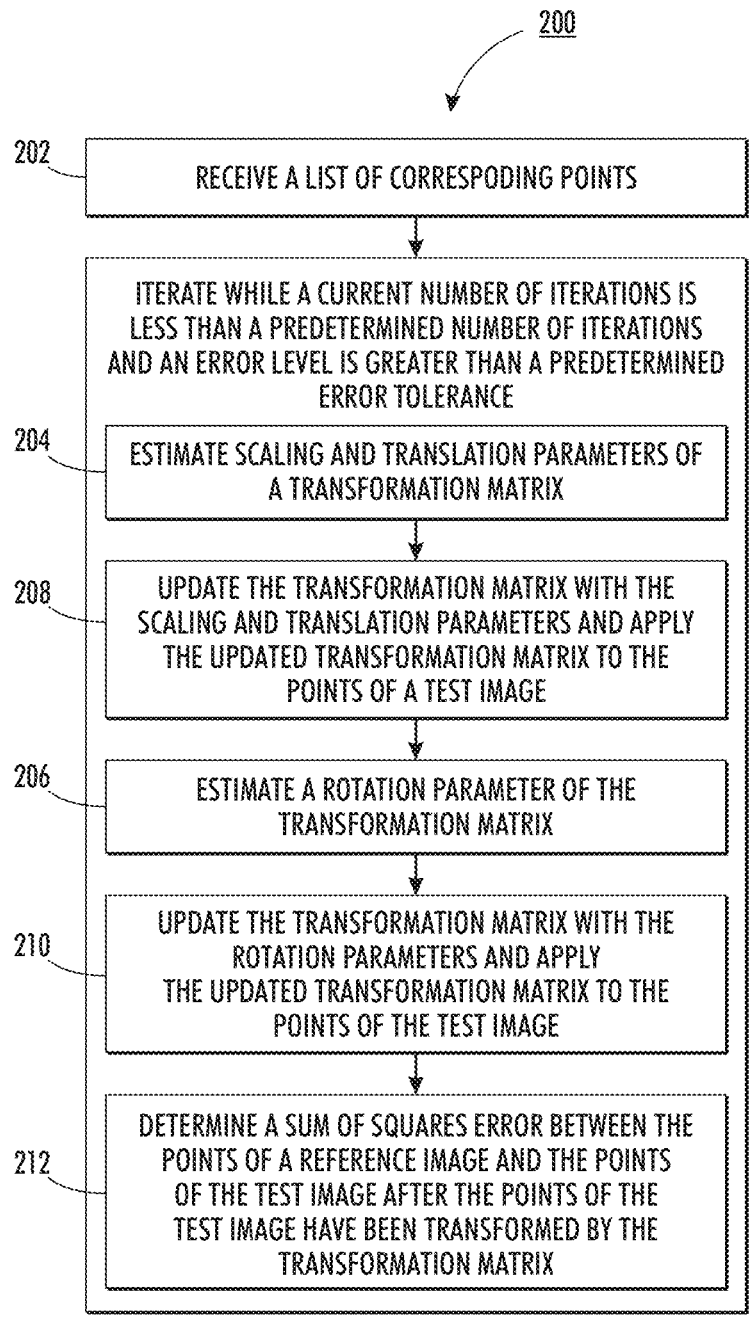
FIG. 11 is a block diagram of an iterative method for determining a transformation matrix.

With reference to FIG. 11, an iterative method 200 for determining the transformation matrix includes receiving 202 the list of corresponding points. The method 200 iterates until a predetermined number of iterations is reached or a predetermined error tolerance is reached. An operator of the method 200 determines the predetermined number of iterations and the predetermined error tolerance.

For each iteration, the method 200 estimates 204 scaling and translation parameters by solving the four parameter linear system of FIG. 12A using a least squares analysis. Further, the method 200 estimates 206 a rotation parameter by solving the linear system of FIG. 12B using a least square analysis. After each estimation of transformation parameter(s), the transformation matrix is updated 208, 210 with the determined transformation parameter(s) and the updated transformation matrix is applied 208, 210 to the points of the test image 12. Further, after the points of the test image 12 have been completely transformed (i.e., scaled, translated and rotated) for an iteration, a sum of squares error is determined 212 between the points of a reference image and the points of the test image 12. The reference image is, for example, a template image of the candidate template model.

As shown in FIG. 12A, transX and transY are the translation parameters of the test image 12 in the x and y directions, respectively. Further, sclX and sclY are the scaling parameters of the test image 12 in the x and y directions, respectively. As shown in FIG. 12B, theta is the rotation parameter of the test image 12. In both FIG. 12A and FIG. 12B, $x_i'$ is the x coordinate of the point of the test image 12 in pair i of the vertical lines and $x_i$ is the x coordinate of the point of the candidate template model of pair i of the vertical lines, where $1 \le i \le n$ and n is the number of pairs of points for vertical lines. Similarly, $y_j'$ is the y coordinate of the point of the test image 12 in pair j of the horizontal lines and $y_j$ is the y coordinate of the point of the candidate template model in pair j of the horizontal lines, where $1 \le j \le m$ and m is the number of pairs of points for horizontal lines.

In view of FIGS. 12A and 12B, the method 200 uses only the x coordinates from the pairs of points of the vertical lines and the y coordinates from the pairs of points of the horizontal lines. This makes the horizontal and vertical lines accountable for the y direction and x direction contribution, respectively, in the transformation parameter estimation. In this way, the x coordinate of the horizontal lines and the y coordinate of the vertical lines are not used as constraints in the transformation parameter estimation, thereby allowing the lines on those directions to be in arbitrary locations.

Referring back to FIG. 9, after determining the transformation matrix, the horizontal and vertical lines of the test image 12 are aligned (i.e., registered) with the horizontal and vertical lines of the candidate template model, respectively, using the transformation matrix. Suitably, the horizontal lines of the test image 12 are transformed separately from the vertical lines of the test image 12 in order to evaluate them in a successive stage independently.

Having aligned the lines of the test image 12, a match score between the aligned lines of the test image 12 and the lines of the candidate template model is determined 160, which is referred to as the forward direction. This includes determining a distance transform for each of the vertical lines and each of the horizontal lines, of the candidate template model. A distance transform specifies the distance from each point on a line to the nearest point on the other curvilinear objects of the candidate template model. When determining the distance transforms, the vertical lines are evaluated independent of the horizontal lines. That is to say, distance is only computed between lines of the same type (i.e., vertical or horizontal). Further, distance for a vertical line is limited to horizontal distance, and distance for a horizontal line is limited to vertical distance. Suitably, the distance transforms are computed as defined in Pedro Felzenszwalb and Daniel Huttenlocher, "Distance Transforms of Sampled Functions", Sep. 1, 2004, incorporated herein by reference in its entirety.

After determining the distance transforms, the aligned lines of the test image 12 are evaluated using the distance transforms of the candidate template model. In evaluating the aligned lines, the vertical lines are evaluated independently of the horizontal lines. Advantageously, by keeping the evaluation separate, the method 150 makes sure that the cost of misalignment is fully accounted for in each direction.

To evaluate an aligned line, every point of the aligned line is assigned a cost associated with the distance to the nearest point on the lines of the candidate template model, the cost determined based on the distance transforms of the candidate model. The associated cost, which is the distance to the nearest point, of every point in each aligned line is accumulated and divided by the total number of points in the aligned line. In some embodiments, the total number of points may include some points that are outside the scope of the distance transforms. These are independently counted and a predetermined cost is used to account them in the cost computation. Distance for a vertical line is limited to horizontal distance, and distance for a horizontal line is limited to vertical distance. Further, distance is only computed between lines of the same type (i.e., vertical or horizontal). The costs of the vertical lines and the horizontal lines are then separately averaged, and a final score is calculated using the average between these two costs. In some embodiments, if the final score exceeds a predetermined level, the method 150 terminates.

In addition to determining the match score in the forward direction, a match score between the aligned lines of the test image 12 and the lines of the candidate template model is determined 162, which is referred to as the backward direction. This includes determining a distance transform for each of the lines of the test image 12. This is performed in the same manner as done for the lines of the candidate template model. Distance for a vertical line is limited to horizontal distance, and distance for a horizontal line is limited to vertical distance. Further, distance is only computed between lines of the same type (i.e., vertical or horizontal).

The lines of the candidate template model are evaluated using the distance transforms of the test image 12. In evaluating the lines of the candidate template model, the vertical lines are evaluated independently of the horizontal lines. To evaluate a line of the candidate template model, every point of the line is assigned a cost associated with the distance to the nearest point on the aligned lines of the test image 12, the cost determined based on the distance transforms of the test image 12. The associated cost, which is the distance to the nearest point, of every point in each candidate template model line is accumulated and divided by the total number of points in the candidate template model line. In some embodiments, the total number of points may include some points that are outside the scope of the distance transforms. These points are independently counted and a predetermined cost is used to account them in the cost computation. The costs of the vertical lines and the horizontal lines are then separately averaged, and a final score is calculated using the average between these two costs.

The final scores from the evaluations in the forward direction and the backward direction are then averaged to create a match score representing the quality (i.e., "goodness") of the match between the test image 12 and the candidate template model. As noted above, the foregoing steps are repeated for each candidate template model, thereby creating a match score for each candidate template model. Once all the candidate template models are processed, the candidate template model with the best match score and the corresponding transformation matrix are determined 164. This is typically the selected candidate model. However, in some embodiments, the best match score must exceed a predetermined level to proceed. Otherwise, the test image 12 is rejected.

Referring back to FIG. 2, the form background information, including line-art and data field text descriptions, is removed (e.g., by background subtraction) 36 from the test image 12 using the selected candidate template model to create a background subtracted image 38. This includes globally registering the test image 12 to the selected candidate template model using the corresponding transformation matrix and removing all image material falling outside data fields defined by the selected candidate model.

Figure 13:
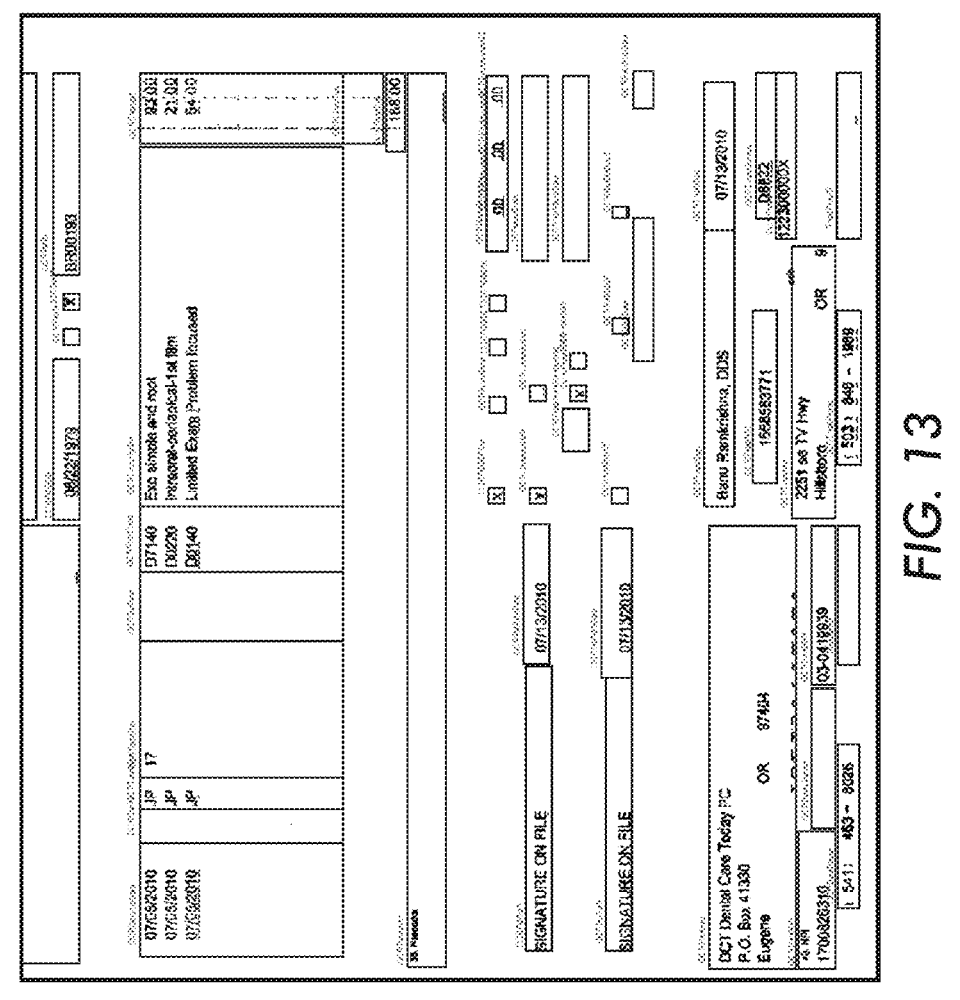

Any one of several methods known by those skilled in the art can be employed to subtract the background information. In one embodiment, the method of Kumar and Doermann, "Fast Rule-line Removal using Integral Images and Support Vector Machines", ICDAR, 2011 Shi, Setlur, incorporated herein by reference in its entirety, is employed. In another embodiment, the method of Govindaraju, "Image Enhancement for Degraded Binary Document Images", ICDAR, 2011, incorporated by reference in its entirety, is employed. FIG. 13 illustrates a portion of a form after form background information removal with an overlay of a zone model.

After generating the background-subtracted image 38, zonal optical character recognition (OCR) can be applied to the background-subtracted image 38 to extract data therefrom. Any number of zonal OCR systems well known to those skilled in the art can be employed. Using the template model employed for background subtraction, the extracted data can be associated with the data fields of the template model.

Advantageously, the method 10 of FIG. 2 allows document type classification and data to be collected from multiple document types with descriptive line-art. The method 10 of FIG. 2 includes a classification technique (i.e., the match-by-alignment method 150 of FIG. 9) that uses characteristic form line-art essential to discrimination when forms are very similar. Common classification techniques perform poorly under these conditions since such techniques fail to capture subtle differences in line-art. In addition, this classification technique is based on the goodness of alignment, which ultimately is required to perform zonal OCR. Setup of the template model database 14 is straightforward requiring nothing more than a representative images to define the template models. Further, the method 10 of FIG. 2 performs better than commercial offerings by taking into account symbolic representation of the line-art and connected components in the test image 12 when subtracting the form background information. This yields a better preservation of the form data text in the test image 12, and it is fundamental for the purpose of zonal OCR extraction.

Figure 14:
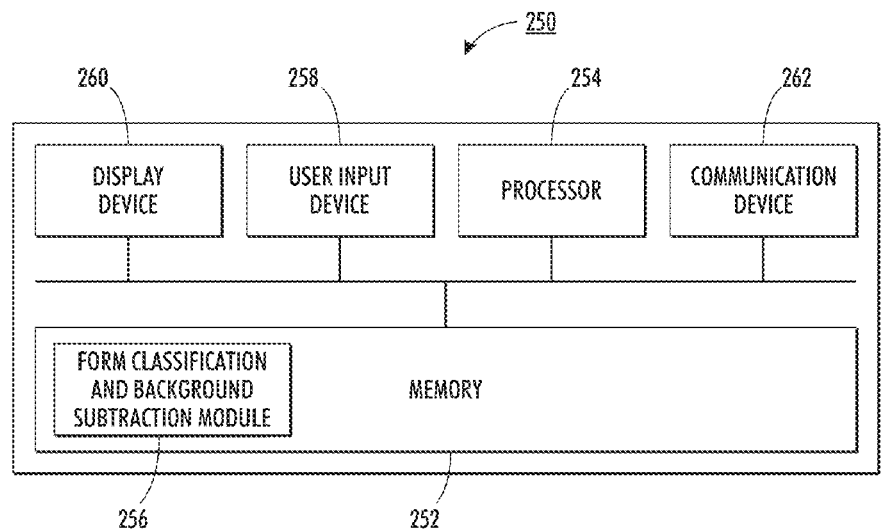
FIG. 14 is an illustration of a data extraction system.

With reference to FIG. 14, a data extraction system 250 includes at least one memory 252 and at least one processor 254. The memory 252 includes a form classification and background subtraction module 256 comprised of processor executable instructions that perform the method 10 of FIG. 2. The memory 252 further includes processor executable instructions that receive a test image, employ the form classification and background subtraction module 256 to create a background subtracted image from the test image, perform zonal OCR on the background subtracted image to extract data from the background subtracted image, and associate the extracted data with the corresponding data fields using a template model associated with the test image. During use of the system 250, the processor 254 executes the processor executable instructions to extract data from the test image. In this way, the processor 254 is programmed to perform the method 10 of FIG. 2 and to extract data from a test image using the method 10 of FIG. 2.

The system 250 can further include, or be operatively connected with, one or more user input devices (e.g., mouse, keyboard, etc.) 258 for receiving user input to control the system 250. For example, the user input devices 258 can be employed to create and/or otherwise specify the template models employed by the form classification and background subtraction module 256. Further, the system 250 can further include, or be operatively connected with, one or more display devices 260 for displaying output generated by the system 250. An optional communication device 262 allows the system 250 to communicate with other systems, for example, over a communications network, such as the Internet, a local area network, a wide area network, and the like. At least one system buses 264 of the system 250 interconnect components thereof, such as the memory 252 and the processor 254.

Figure 15:
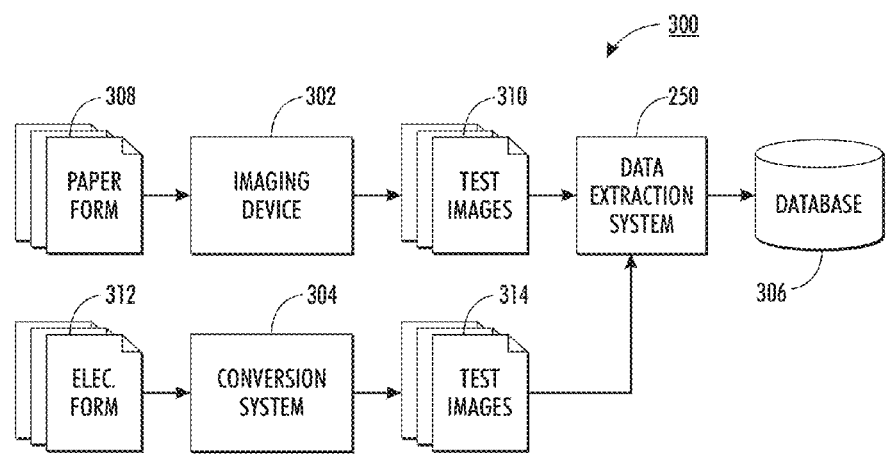
FIG. 15 is an illustration of a form processing system suitably employing the data extraction system of FIG. 14.

With reference to FIG. 15, a form processing system 300 employing the data extraction system 250 of FIG. 14 is illustrated. The form processing system 300 may include an imaging device 302, a conversion system 304, the data extraction system 250 of FIG. 14 and a database 306. Notably, however, the form processing system 300 may alternatively only include one of the imaging device 302 and the conversion system 304.

The imaging device 302 converts one or more paper forms 308 into test images 310. The imaging device 302 may be one or more of a camera, a scanner, and the like. In certain embodiments, the imaging device 302 may receive the paper forms 308 via a conveyor path extending from a feed tray. However, other means of receiving the paper forms 308 are equally amenable. For example, in certain embodiments, an operator of the form processing system 300 may feed the paper forms 308 to the imaging device 302. The conversion system 304 converts one or more electronic forms 312 into test images 314. The electronic forms 312 can be formatted in PDF, XML, Word, and the like. Further, the electronic forms 312 may be loaded from a magnetic or optical media or a network.

The data extraction system 250 processes the test images 310, 314 to extract data contained therein according to the method 10 of FIG. 2. Suitably, the data extraction system 250 may receive the test images 310, 314 via a communications network, such as the Internet, a local area network, a wireless network, and the like. However, in other embodiments, the data extraction system 250 may receive the test images 310, 314 via a data bus, such as USB, Firewire, etc., a storage medium, such as a CD, a thumb drive, etc., and the like.

The database 306 stores data extracted from the test images 310, 314. Suitably, the database 306 receives the data from the data extraction system 250 via a communications network, such as the Internet, a local area network, a wireless network, and the like. In certain embodiments, the database 306 may be distributed across a plurality of computer servers interconnected by a communications network. The database 306 suitably stores the data in a table structure having fields corresponding to the fields of the forms.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for classifying forms, said method comprising:
receiving by at least one processor an image representing a form of an unknown document type, the image including line-art;
receiving by the at least one processor a plurality of template models corresponding to a plurality of different document types;
selecting by the at least one processor a subset of the plurality of template models as candidate template models, the candidate template models including line-art junctions best matching line-art junctions of the received image; and,
selecting by the at least one processor one of the candidate template models as a best candidate template model, the best candidate template model including horizontal and vertical lines best matching horizontal and vertical lines of the received image, respectively, aligned to the best candidate template model.

2. The method according to claim 1, wherein the selecting the subset of the plurality of template models includes:
generating a fingerprint histogram of the received image;
determining, for each of the plurality of template models, a match quality between the fingerprint histogram of the received image and a fingerprint histogram of the template model; and,
determining the candidate template models based on the determined match qualities, the candidate template models including template models of the plurality of template models with best match qualities.

3. The method according to claim 2, wherein the generation of the fingerprint histogram of the received image includes:
extracting line-art junctions from received image;
generating fingerprints from the extracted line-art junctions, the extracted line-art junctions being keypoints of the fingerprints;
for each of the generated fingerprints, determining a match count indicating the number of times the fingerprint appears in the received image; and,
combining the generated fingerprints and the determined match counts into the fingerprint histogram of the received image.

4. The method according to claim 1, wherein the selecting the one of the candidate template models includes:
extracting horizontal and vertical lines from the received image;
for each of the candidate template models:
aligning the extracted horizontal and vertical lines to horizontal and vertical lines of the candidate template model, respectively;
determining a forward match score indicating a match quality of the aligned horizontal and vertical lines to the horizontal and vertical lines of the candidate template model, respectively; and,
determining a backward match score indicating a match quality of the horizontal and vertical lines of the candidate template model to the aligned horizontal and vertical lines, respectively; and,
determining the best candidate template model based on the forward and backward match scores.

5. The method according to claim 4, wherein the aligning includes:
comparing the extracted horizontal and vertical lines to the horizontal and vertical lines of the candidate template model, respectively, to determine a list of corresponding points;
determining a transformation matrix registering received-image points of the list of corresponding points to candidate-template-model points of the list of corresponding points; and,
transforming the extracted horizontal and vertical lines using the transformation matrix to align the extracted horizontal and vertical lines.

6. The method according to claim 5, wherein the determining the transformation matrix only considers horizontal positioning of points of the list of corresponding points corresponding to vertical lines and only considers vertical positioning of points of the list of corresponding points corresponding to horizontal lines.

7. The method according to claim 4, wherein the first match score and the second score are determined using distance transforms of the horizontal and vertical lines of the candidate template model and distance transforms of the aligned horizontal and vertical lines, respectively.

8. The method according to claim 1, further including:
removing background form information of the received image using the best candidate template model to create a background-subtracted image; and,
extracting data from the background-subtracted image using zonal optical character recognition.

9. The method according to claim 1, wherein the horizontal and vertical lines of the best candidate template model are continuous and the horizontal and vertical lines of the received image are continuous.

10. The method according to claim 1, wherein the horizontal and vertical lines of the best candidate template model correspond to line-art of the best candidate template model and the horizontal and vertical lines of the received image correspond to the line-art of the received image.

11. A system for classifying forms, said system comprising:
at least one processor programmed to:
receive an image representing a form of an unknown document type, the image including line-art;
receive a plurality of template models corresponding to a plurality of different document types;
select a subset of the plurality of template models as candidate template models, the candidate template models including line-art junctions best matching line-art junctions of the received image;
aligning continuous horizontal and vertical lines of the line-art to continuous horizontal and vertical lines of the candidate template models, respectively; and,
select one of the candidate template models as a best candidate template model, the best candidate template model including continuous horizontal and vertical lines best matching continuous horizontal and vertical lines of the line-art, respectively, aligned to the best candidate template model.

12. The system according to claim 11, wherein the selecting the set of the plurality of template models includes:
generating a fingerprint histogram of the received image;
determining, for each of the plurality of template models, a match quality between the fingerprint histogram of the received image and a fingerprint histogram of the template model; and,
determining the candidate template models based on the determined match qualities, the candidate template models including template models of the plurality of template models with best match qualities.

13. The system according to claim 12, wherein the generation of the fingerprint histogram of the received image includes:
extracting line-art junctions from received image;
generating fingerprints from the extracted line-art junctions, the extracted line-art junctions being keypoints of the generated predetermined number of fingerprints;
for each of the generated fingerprints, determining a match count indicating the number of times the fingerprint appears in the received image; and,
combining the generated predetermined number of fingerprints and the match counts into the fingerprint histogram of the received image.

14. The system according to claim 11, wherein the selecting the one of the candidate template models includes:
extracting the horizontal and vertical lines from the received image;
for each of the candidate template models:
aligning the extracted horizontal and vertical lines to horizontal and vertical lines of the candidate template model, respectively;
determining a forward match score indicating a match quality of the aligned horizontal and vertical lines to the horizontal and vertical lines of the candidate template model, respectively; and,
determining a backward match score indicating a match quality of the horizontal and vertical lines of the candidate template model to the aligned horizontal and vertical lines, respectively; and,
determining the best candidate template model based on the first and second match scores.

15. The system according to claim 14, wherein the aligning includes:
comparing the extracted horizontal and vertical lines to the horizontal and vertical lines of the candidate template model, respectively, to determine a list of corresponding points;
determining a transformation matrix registering received-image points of the list of corresponding points to candidate-template-model points of the list of corresponding points; and,
transforming the extracted horizontal and vertical lines using the transformation matrix to align the extracted horizontal and vertical lines.

16. The system according to claim 15, wherein the determining the transformation matrix only considers horizontal positioning of points of the list of corresponding points corresponding to vertical lines and only considers vertical positioning of points of the list of corresponding points corresponding to horizontal lines.

17. The system according to claim 14, wherein the first match score and the second score are determined using distance transforms of the horizontal and vertical lines of the candidate template model and distance transforms of the aligned horizontal and vertical lines, respectively.

18. The system according to claim 11, wherein the at least one processor is further programmed to:
remove background form information of the received image using the best candidate template model to create a background-subtracted image; and,
extract data from the background-subtracted image using zonal optical character recognition.

19. A system for classifying forms, said system comprising:
at least one processor programmed to:
receive an image representing a form of an unknown document type, the image including line-art;
receive a plurality of template models corresponding to a plurality of different document types;
extract horizontal and vertical lines from the received image;
for each of the plurality of template models:
align extracted horizontal and vertical lines to horizontal and vertical lines of the template model, respectively;
determine a forward match score indicating a match quality of the aligned horizontal and vertical lines to the horizontal and vertical lines of the template model, respectively; and,
determine a backward match score indicating a match quality of the horizontal and vertical lines of the template model to the aligned horizontal and vertical lines, respectively; and,
determine a best one of the plurality of template models based on the first and second match scores.

20. The system according to claim 19, wherein the aligning includes:

comparing the extracted horizontal and vertical lines to the horizontal and vertical lines of the candidate template model, respectively, to determine a list of corresponding points;

determining a transformation matrix registering received-image points of the list of corresponding points to candidate-template-model points of the list of corresponding points; and, transforming the extracted horizontal and vertical lines using the transformation matrix to align the extracted horizontal and vertical lines.

21. The system according to claim 19, wherein the first match score and the second score are determined using distance transforms of the horizontal and vertical lines of the candidate template model and distance transforms of the aligned horizontal and vertical lines, respectively.

22. The system according to claim 19, wherein the processor is further programmed to:

remove background form information of the received image using the best template model to create a background-subtracted image; and, extract data from the background-subtracted image using zonal optical character recognition.

* * * * *